June 17, 1952  R. L. HERRELL  2,600,767
MECHANISM FOR SHIFTING GEARS
Filed Dec. 28, 1948  3 Sheets-Sheet 1

INVENTOR.
Robert L. Herrell
BY
Wayland D. Keith
HIS AGENT

June 17, 1952 R. L. HERRELL 2,600,767
MECHANISM FOR SHIFTING GEARS
Filed Dec. 28, 1948 3 Sheets-Sheet 2
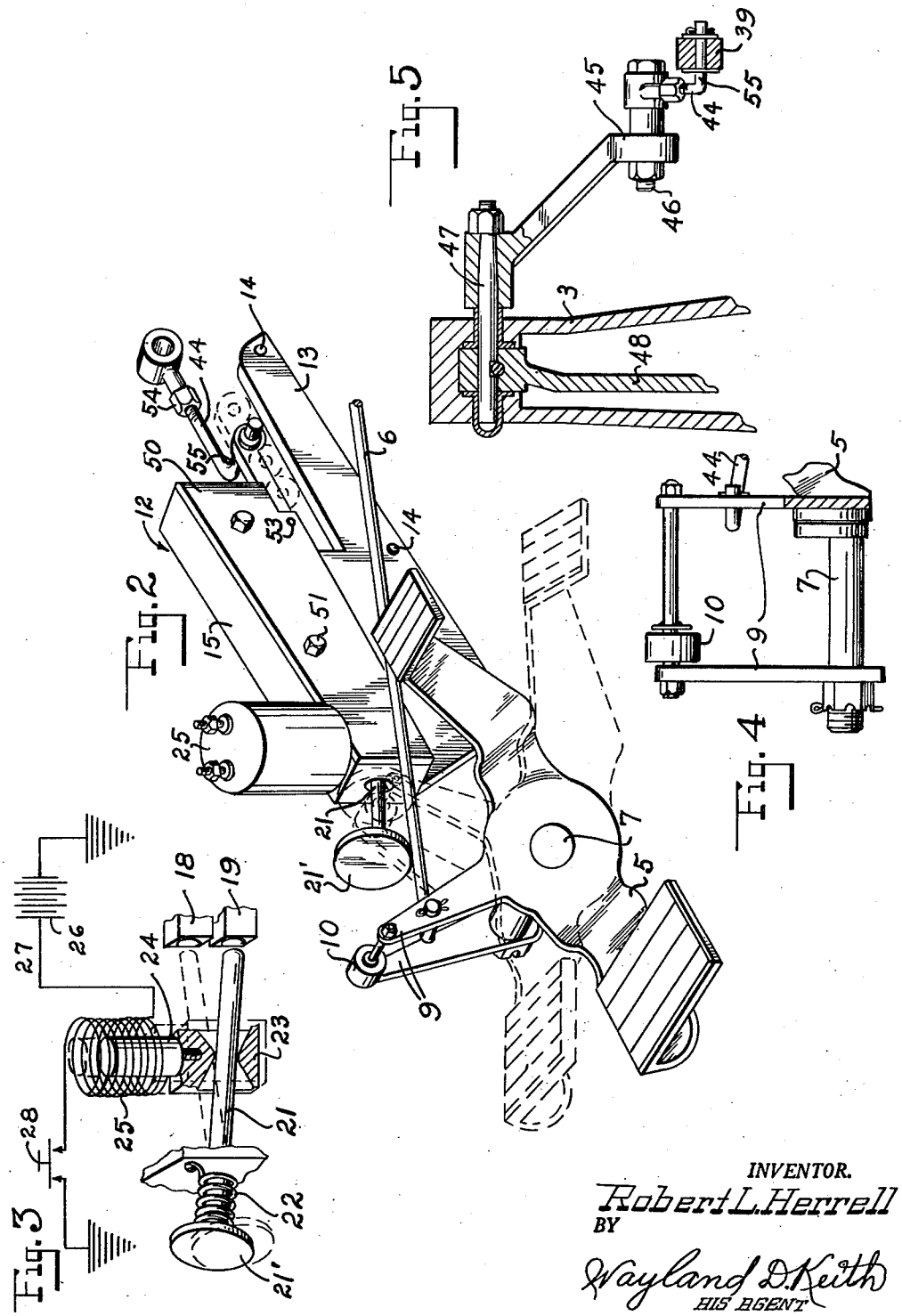
INVENTOR.
Robert L. Herrell
BY
Wayland D. Keith
HIS AGENT June 17, 1952     R. L. HERRELL     2,600,767
MECHANISM FOR SHIFTING GEARS
Filed Dec. 28, 1948     3 Sheets-Sheet 3
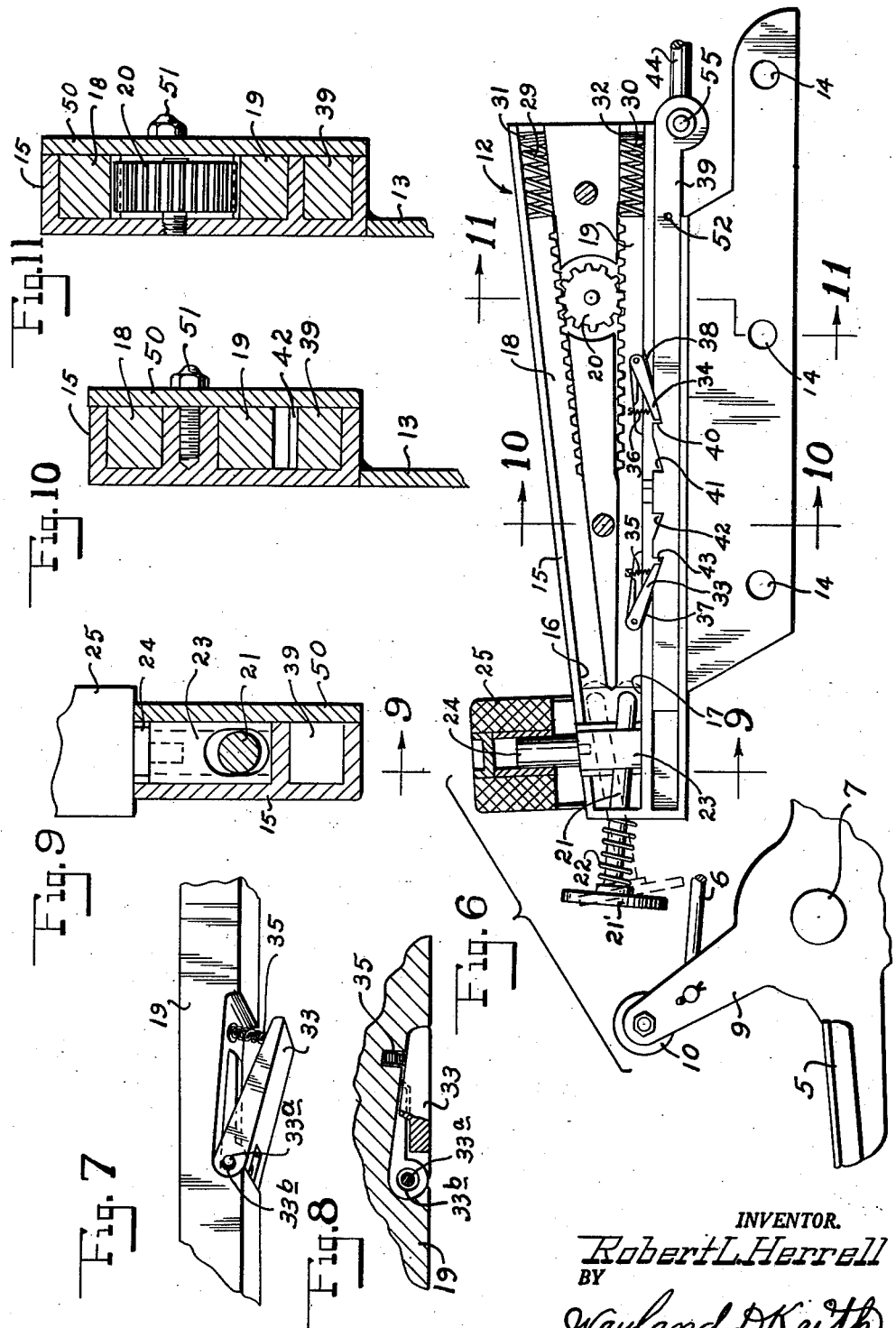
INVENTOR.
*Robert L. Herrell*
BY
*Wayland D. Keith*
HIS AGENT Patented June 17, 1952

2,600,767

UNITED STATES PATENT OFFICE 2,600,767

MECHANISM FOR SHIFTING GEARS

Robert Lee Herrell, Wichita Falls, Tex.

Application December 28, 1948, Serial No. 67,730

6 Claims. (Cl. 192—3.5)

This invention relates to improvements in transmissions, and more particularly to a mechanism for changing the speed in a transmission simultaneously with the control of a clutch member.

Heretofore, a change in driving speed of a motor vehicle, such as a motor cycle or the like, required the disengagement of a clutch and the manual shifting of the gears. The shifting of gears required the release of the handle bar by one of the hands so as to manipulate the gear shift lever, which created a traffic hazard and danger to the rider of the motor vehicle. The traffic rules and regulations in some States require that the rider of a motor vehicle keep both hands on the handle bars at all times, which would be impossible with the motor vehicles now in general use.

One object of this invention is to provide for the control of speed change mechanism of a motor vehicle in coordinated relation with the clutch control mechanism.

Another object of this invention is to provide gear shifting mechanism that may be operated without removing the hands from the handle bars.

Another object of this invention is to provide a gear shifting mechanism which insures a full disengagement of the clutch before the gears can be shifted into another gear, thereby preventing the chipping of the teeth or causing other damage incident to shifting gears while the clutch is engaged.

In the present invention the shifting of the gears may be done expeditiously and without removing the hands from the handle bars of the vehicle, which provides for greater safety in changing speeds and also for a more rapid shifting of the gears, which is helpful especially in racing vehicles, as full coordination of parts is accorded between the clutch pedal and the gear shifting operations, by a push-button, which does not necessitate releasing the handle bars in order to make a change in gears.

An embodiment of this invention is illustrated in the accompanying drawings, in which:

Fig. 2 is a perspective view of the gear shift mechanism, removed from the motor cycle, with an alternate position of the mechanism shown in dot-dash outline;

Fig. 3 is a diagrammatic view, partly in perspective, showing the electrical control mechanism;

Fig. 4 is a side elevation, partly in section, showing the gear shift actuating arm attached to the clutch pedal;

Fig. 5 is a cross section, partly in elevation, showing the linkage connecting the gear shift mechanism with the transmission;

Fig. 6 is a fragmentary side elevation of the gear shift mechanism with parts broken away and in section, and with other parts removed, to illustrate the details of construction;

Fig. 7 is a perspective view of the shifter bar showing the pawl thereof in open position;

Fig. 8 is a longitudinal section through the shifter bar and pawl, partly in elevation, with the pawl in closed position;

Fig. 9 is a cross section on the line 9—9 in Fig. 6;

Fig. 10 is a cross section on the line 10—10 in Fig. 6; and

Fig. 11 is a cross section on the line 11—11 in Fig. 6.

Figure 1:
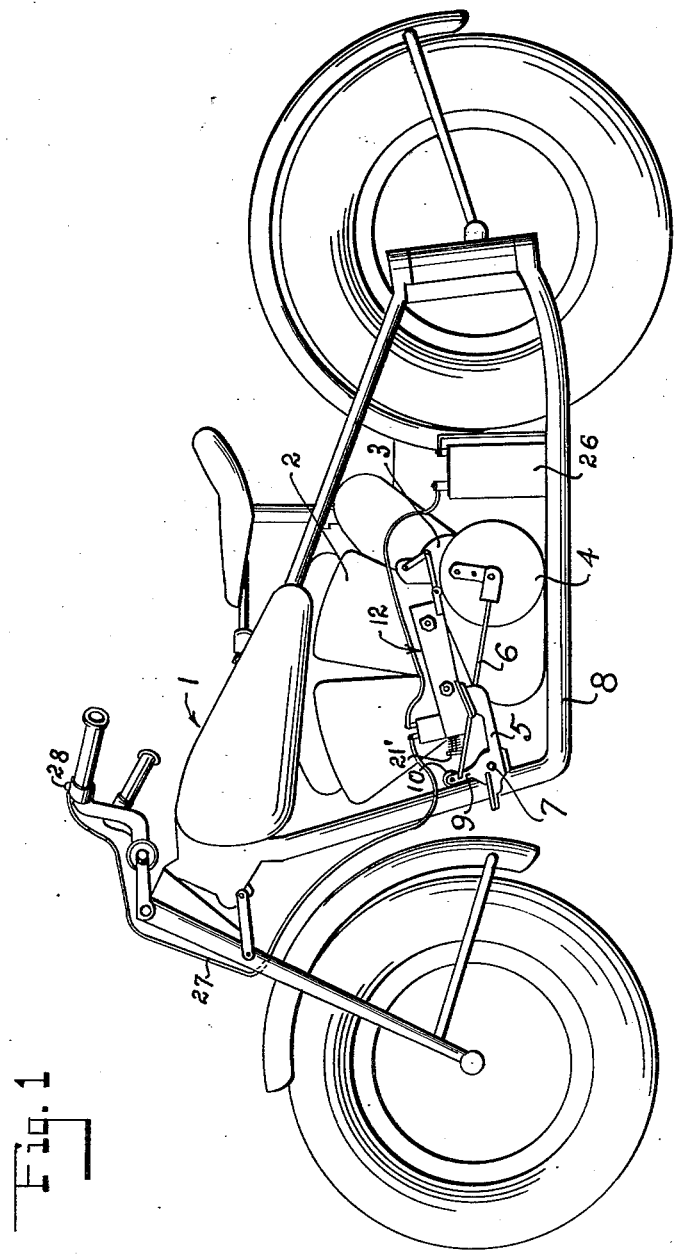
Fig. 1 is a side elevation of a motor cycle showing the invention applied thereto.

With more detailed reference to the drawings, the numeral 1 designates generally a motor cycle of the conventional type, and which motor cycle has an engine 2 and the usual change speed transmission 3, and a clutch 4. The clutch 4 is operated by a clutch pedal 5 connected with the clutch by a link or rod 6. The clutch pedal 5 is pivotally mounted at 7 on the frame 8 of the motor cycle and has an upwardly extending arm 9, which arm 9 carries a roller 10 on the upper end thereof.

A gear shift mechanism is designated generally by the numeral 12, in Figs. 1 and 2. The gear shift mechanism 12 is carried by a mounting bracket 13 having holes 14 therein, which bracket is adapted to be attached to a portion of the frame of the motor 2, by bolts which pass through the holes 14.

A housing 15 has a pair of diverging guideways 16 and 17, respectively. The diverging guideways are disposed within the housing in such manner as to receive rack slide bars 18 and 19, respectively. The rack slide bars 18 and 19 interengage a gear 20, as shown in Fig. 6, so that, when one of the rack bars is moved in one direction, the other rack bar, which is engaged with gear 20 on the opposite side of said gear, will move in the opposite direction.

The rack bars 18 and 19 are adapted to be actuated by a plunger 21 which is slidably and flexibly mounted in the end of the housing 15, and has a plate 21' on the end thereof in position to be engaged by the roller 10 carried by the clutch pedal 5, when the latter is moved beyond a predetermined point. The plunger 21 normally is held outward by a spring 22, which spring is telescoped over the plunger 21 and interposed between the plate 21' and the end of the housing 15 and is also fixed to the plunger so as to retain the plunger 21 against undue outward movement. The plunger 21 is free to swing vertically of the end of the housing 15, as indicated in full lines and in dotted lines in Fig. 6. The plunger 21 is normally positioned in alignment with the rack slide bar 19 whereby to perform certain gear shifting operations. However, the plunger 21 passes through a yoke 23, as shown in Figs. 3 and 9, which yoke 23 is connected to a solenoid plunger or core 24, having a surrounding coil 25, which upon being engaged will cause the solenoid core 24 to move upward, as indicated in dot-dash outline in Fig. 3, so as to position the plunger 21 for engagement with the slide rack bar 18.

The solenoid coil 25 is adapted to be energized by a battery 26, connected in series in a circuit 27, that also includes a switch, such as a push button switch 28, that may be mounted within convenient reach, as on the handle bars of the motor cycle. The closing of the switch 28 will cause a grounding of the circuit to cause the actuation of the solenoid core 24 to lift the yoke 23 and the plunger 21 into position as shown in dot-dash outline in Fig. 3, to enable the movement of the slide rack bar 18 by the actuation of the plunger to shift certain of the gears, as will be described more fully hereinafter.

The rack bars 18 and 19 are spaced apart to receive the gear 20, which gear is free to idle, and will move the opposite gear rack in the opposite direction, against the tension of springs 29 and 30. The tension of these springs may be varied by the use of shims 31 and 32 positioned between the respective ends of the springs and the housing 15, so as to compress the springs, as will be seen in Fig. 6.

The slide rack bar 19 carries a pair of pawls 33 and 34 turned in opposite directions, and which pawls normally are pressed downward by the respective springs 35 and 36. However, upon movement of the rack bar 19 toward the plunger 21, an inclined face 37 on the lower portion of the slideway 17 will cause the pawl 33 to retract into a recess formed in the slide bar 19, as will be seen in Figs. 6 and 8. Upon movement of the slide bar 19 in the opposite direction, an inclined surface 38 will likewise cause the pawl 34 to retract into a similar recess formed within the slide bar 19.

Each of the pawls 33 and 34 is pivotally mounted on the bar 19 on a a loose journal, whereby the pawl will seat in the notch in the bar. The journal pin 33a (Fig. 8) is appreciably smaller in diameter than the hole 33b in the pawl, which allows bodily movement of the pawl relative to the bar.

A notched gear shift slide bar 39 is mounted immediately below the slide rack bar 19, and the pawl 34 normally is in position to engage notches 40 and 41, and the pawl 33 is in position to engage notches 42 and 43, in the slide bar 39, as will be described more fully hereinafter. The gear shift slide bar 39 is connected with a link 44 that is pivotally connected to an arm 45 by a bolt 46 (Fig. 5). The arm 45 is connected with the conventional gear shift shaft 47 on which is mounted a gear shift lever 48 within the transmission casing 3. The lever 48 is adapted to shift the usual change speed transmission gears.

The slide racks 18 and 19, as well as the gear shift slide bar 39, are retained in operative position in the housing 15, by a cover plate 50 which is held in place by screw bolts 51, as shown in Figs. 1 and 10.

*Operation*

As explained above, the conventional motor cycle is equipped with a hand operated gear-shift lever which is unnecessary according to this invention. Therefore, the removal of the hand from the handle bars, in order to shift the gears, is unnecessary, as the entire shifting action is accomplished by the foot. Upon depressing the rearward portion of the pedal 5 slightly, the rod 6 will operate to release the clutch 4 before the roller 10 contacts the plunger plate 21' on the plunger 21.

By depressing further the rear portion of the clutch pedal 5, the plunger 21 will be moved inward against the tension of the spring 22, and engage either the slide rack 19 or the slide rack 18 to move said slide rack the distance of one ratchet notch in the bar 39, as from 43 to 42, which in turn, will move the link 44 through a like distance to shift the gears into a selected arrangement in transmission casing 3.

With the shifting mechanism in neutral, to shift into low gear, the switch 28 is closed, which energizes the solenoid 24—25 to lift the yoke 23 and the plunger 21 into the position shown in dashed outline in Fig. 6 so as to position the plunger 21 in end-to-end alignment with gear rack slide bar 18. Then, upon depressing the rear portion of the clutch pedal 5, the clutch 4 is disengaged. Then, upon further downward movement of the pedal 5, the roller 10 mounted on the arm 9, contacts the plunger plate 21', and, with the plunger 21 in end-to-end alignment with the gear rack slide bar 18, the plunger 21 will be moved a predetermined distance.

This, in turn, rotates the gear 20, which gear 20 is in mesh with the rack 19 carrying the pawls 33 and 34, which will cause the pawl 34 to drop into the notch 40 in the shift slide bar 39, which will move this shift slide bar 39 a distance forward equal to the distance that gear rack slide bar 18 was moved rearward by the plunger 21. This will move the link 44 forward to move the arm 45, to rotate the shaft 47 to move the shifter arm 48 within the transmission 3. In so doing, certain index means within the transmission 3 will move into a notch to hold the transmission gearing mechanism in low speed position.

At the same time that the gear rack 18 moves rearward, the spring 29 is compressed and the spring 30 is relieved of tension. However, these springs are so balanced, by means of spacers 31 and 32, that the slide bars 18 and 19 will return to the position shown in Fig. 6, upon the release of the plunger 21. The push button switch 28 may be released immediately upon the shifting of the gears, thereby permitting the plunger 21 to drop into the position shown in full outline in Fig. 6.

On various types of motor cycles, the distance of movement of the gear mechanism will vary, but on one particular type of motor cycle, this distance is approximately ¾ inch. The movement that has been transmitted by the plunger 21 is the pitch of one notch, as from 40 to 41, which is the distance mentioned above. Upon engagement of the gears, as hereinbefore described, and with the transmission gear mechanism in low speed position, the clutch is released, which will permit the plunger 21 to move outward under the influence of the spring 22, and upon further movement of the clutch pedal 5, the clutch will be engaged so as to give the motor cycle sufficient momentum to enable the shifting into second or intermediate speed position.

To shift into second or intermediate speed position, and with the switch 28 released, the plunger 21 will be aligned with the gear rack 19. Then, upon downward movement of the rear portion of the clutch pedal 5, the gear rack slide bar 19 will be moved rearward, and with the spring 35 pushing the pawl 33 downward into the notch 42, the shift bar 39 will be moved rearward a predetermined amount, which in the motor cycle mentioned above, will be approximately ⅜ inch, into a neutral position between second and low speed positions. At this point an index pin within the transmission 3 of the motor cycle will define a neutral or non-engagement of gears, in which the shifting mechanism may be left, if desired, or, by the movement of ⅜ inch, the shift bar 39 will be moved so as to cause engagement of the second or intermediate gear, at which point the clutch pedal will be released to release the plunger 21 and permit the spring 30 to return the slide bars 19 and 18 to the positions shown in Fig. 6.

The gear shifter bar 39 will also be in position as shown in Fig. 6, with the pawls 33 and 34 positioned in notches 43 and 40, respectively. When the motor cycle has gained sufficient momentum in second gear, the gears can be shifted to high speed positions by pushing on the clutch pedal 5, as hereinbefore described, which will push the plunger 21 into contact with the slide rack bar 19, and with the pawl 33 engaged in the notch 43, the movement of the slide rack bar 19 the distance from the end of the pawl to the end shoulder of the notch 43, as shown in Fig. 6, will cause the pawl 34 to move into contact with the angular face 38 of the guideway 17, which will cause the pawl 34 to move upward into the recess within the slide bar 19 to be moved rearward a predetermined distance, which is the pitch of one notch, usually about ¾ inch. This will shift the gears into high speed position, when an index pin within the transmission 3 will hold the gears in this position. Upon release of the clutch pedal 5, the spring 22 will move the plunger 21 outward to the position shown in full outline in Fig. 6, and the spring 30 will return the gear rack slide bar 19 into the position shown in Fig. 6.

When it is desired to shift to a lower speed position, the switch 28 is closed, which will move plunger 21 into aligned relation with the gear rack bar 18, and then the clutch pedal 5 is moved successively, as many times as it is desired to shift step-by-step to successively lower speed positions, and the operation of the shifting mechanism will be performed substantially as described above.

With the present arrangement of gear shifting, this gear shifting operation is performed mainly by the operation of a single foot pedal which actuates both the clutch and the gear shift lever in timed sequence, so as to prevent the gears from being engaged before the clutch is completely disengaged. Furthermore, complete engagement in the selected gear is assured, or in a neutral position, before the clutch can be engaged.

In order to start the engine, the clutch must be fully engaged, since the engine is cranked through the clutch. Therefore, the transmission must be left in neutral position or in disengagement of all gears for starting the power plant by a crank.

The plunger 21 normally is in the downward position to engage the rack bar 18, which permits shifting to higher speed positions without depressing the switch button 28; however, to shift to lower speed positions, it is necessary to press the switch button, so as to direct the plunger toward rack bar 18.

The timing of the gear shifter bar 39 is accomplished by setting the transmission in a predetermined speed position, such as second speed, and then aligning a hole 52 in the shifter bar 39 with a hole 53 in the cover plate 50 of the housing 15. An adjustment of a take-up nut 54 on the link 44 will permit adjustment of the length of the link 44 to bring these two holes 52 and 53 into correct register and permit a tool or pin to be inserted therethrough to determine accurately and expeditiously the correct setting of the mechanism. After the mechanism has been set, and the nut 54 tightened to hold it in place, it will remain normally in the correct adjusted position.

While the mechanism has been described in some detail as applied to a motor cycle, it is to be understood that it is to be used on any mechanism for which it is adapted, and that changes may be made in the minor details of construction, and adaptations made for the use thereof on various types of mechanisms, without departing from the invention, except as specified in the claims.

I claim:

1. In a motor cycle having handle bars and a driving motor, the combination with change speed driving mechanism for driving the motor cycle, of foot pedal means, a control unit operatively connected with the change speed driving mechanism, a foot pedal, means for connecting the foot pedal operatively with the control unit to actuate said unit thereby, electrically operated means for shifting said connecting means to vary the action thereof on the control unit, an energizing circuit for said electrically operated means, and a hand switch in said circuit mounted on the handle bars.

2. In a motor vehicle having a frame, handle bars mounted thereon, a power motor, and a change speed transmission, the combination of a control unit for the transmission including a shiftable operating member to vary the action thereof on the transmission, electrical means for shifting said member, and a hand switch mounted on said handle bars for controlling said electrical means.

3. In a motor vehicle having a frame, handle bars mounted thereon, a power motor, and a change speed transmission, the combination of a control unit for the transmission including a shiftable operating member to vary the action thereof on the transmission, electrical means for shifting said member, a hand switch mounted on said handle bars for controlling said electrical means, and a foot pedal in position for operating said operating member.

4. In speed changing mechanism for a motor vehicle, slide bars, means operatively connecting said slide bars together for synchronous movement in opposite directions, an operating member for said slide bars, a control bar for the speed changing mechanism operated by the slide bars, and ratchet means operatively connecting one of the slide bars with the control bar.

5. In speed changing mechanism for a motor vehicle, slide bars, means operatively connecting said slide bars together for synchronous movement in opposite directions, an operating member for said slide bars, a control bar for the speed changing mechanism operated by the slide bars, springs acting on the slide bars tending to move the same in one direction, and means for adjusting the tension of the springs.

6. In a speed change mechanism for motor vehicles, a speed change transmission, a clutch, a rack bar actuator, a foot pedal operatively connected with said clutch and with said speed change mechanism, said speed change mechanism including rack bars to operate said mechanism in co-ordinated relation, electro-magnetic means for selectively positioning said actuator for said rack bars, and electrical control means for controlling said electromagnetic means for selectively positioning said actuator in position, so upon movement of said foot pedal said rack bars in said speed change mechanism are actuated so as to change from one speed to another speed.

ROBERT LEE HERRELL.

REFERENCES CITED

The following references are of record in the file of this patent:

UNITED STATES PATENTS

| Number | Name | Date |
|---|---|---|
| 1,304,955 | Fowler | May 27, 1919 |
| 1,319,514 | Cottrill | Oct. 21, 1919 |
| 1,433,130 | Gibson | Oct. 24, 1922 |
| 1,936,996 | Spikes | Nov. 28, 1933 |

FOREIGN PATENTS

| Number | Country | Date |
|---|---|---|
| 716,888 | France | Oct. 13, 1931 |